United States Patent [19]

Gustafsson

[11] 4,089,500
[45] May 16, 1978

[54] LOCKING DEVICE, PARTICULARLY FOR AUTOMOBILE SEATS

[76] Inventor: Gustaf Erik Gustafsson, Januarinägen 19, Växjö, Sweden

[21] Appl. No.: 768,023

[22] Filed: Feb. 14, 1977

[30] Foreign Application Priority Data

Feb. 19, 1976 Sweden .............................. 7601996

[51] Int. Cl.² ............................................ F16M 13/00
[52] U.S. Cl. .................................................. 248/429
[58] Field of Search ............... 248/430, 429, 424, 419, 248/420, 501, 503.1

[56] References Cited

U.S. PATENT DOCUMENTS

| 872,247 | 11/1907 | Moss | 248/429 |
| 3,044,829 | 7/1962 | Dolgorukov | 248/429 |
| 3,981,473 | 9/1976 | Nagai | 248/430 |

FOREIGN PATENT DOCUMENTS

| 531,413 | 8/1931 | Germany | 248/408 |
| 371,230 | 9/1963 | Switzerland | 248/420 |
| 234,003 | 5/1925 | United Kingdom | 248/429 |
| 671,903 | 5/1952 | United Kingdom | 248/408 |
| 779,532 | 7/1957 | United Kingdom | 248/430 |

*Primary Examiner*—Marion Parsons, Jr.
*Attorney, Agent, or Firm*—Charles A. Laff; J. Warren Whitesel; Howard B. Rockman

[57] ABSTRACT

A locking device for adjustably locking two mutually movable parts with respect to each other, particularly for preventing an automobile seat from sliding longitudinally along the floor of an automobile. A stationary member is secured to the floor and is provided with teeth for cooperating with a toothed member which is secured to the automobile seat. The two sets of teeth are normally urged into engagement with each other by means of a spring member. For adjustment, the second part can be displaced at right angles to the floor in such manner that the two sets of teeth are disengaged, thereby permitting the seat to slide longitudinally with respect to the floor.

9 Claims, 14 Drawing Figures

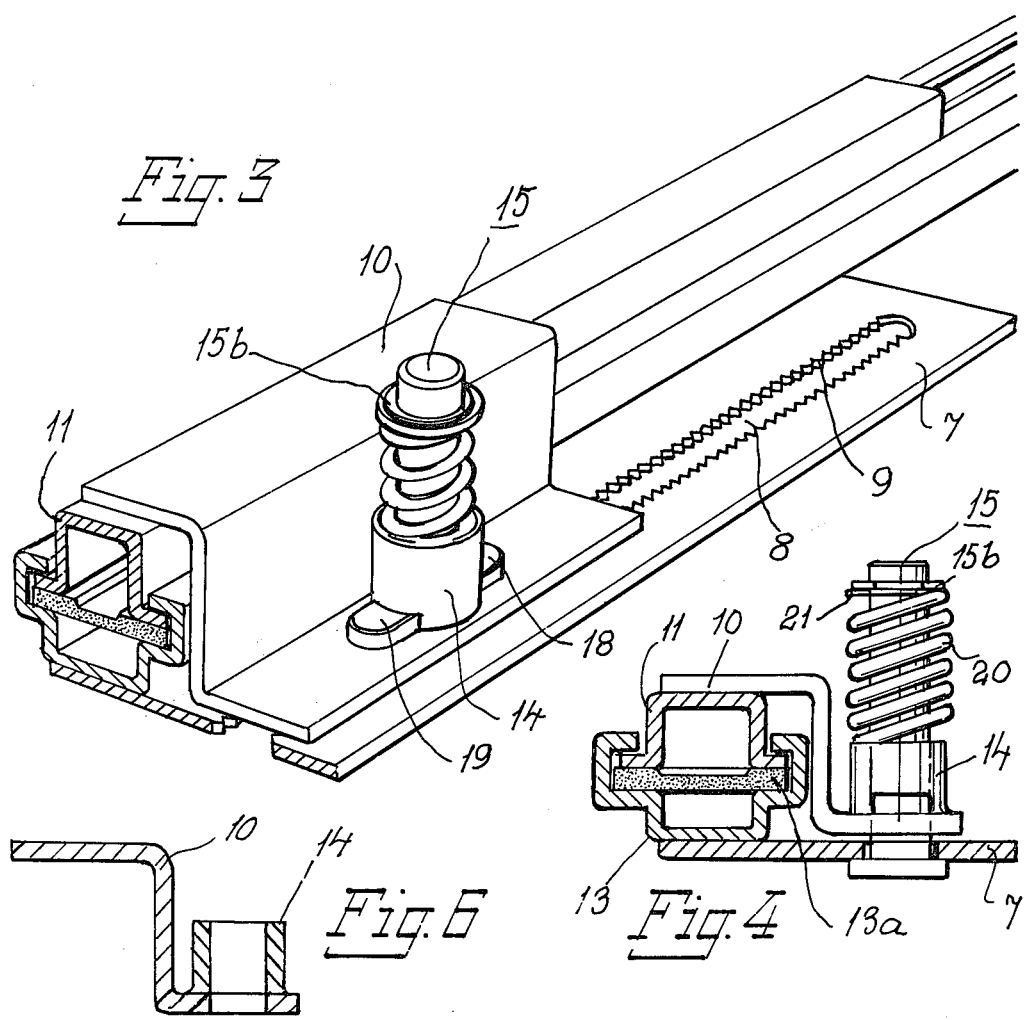
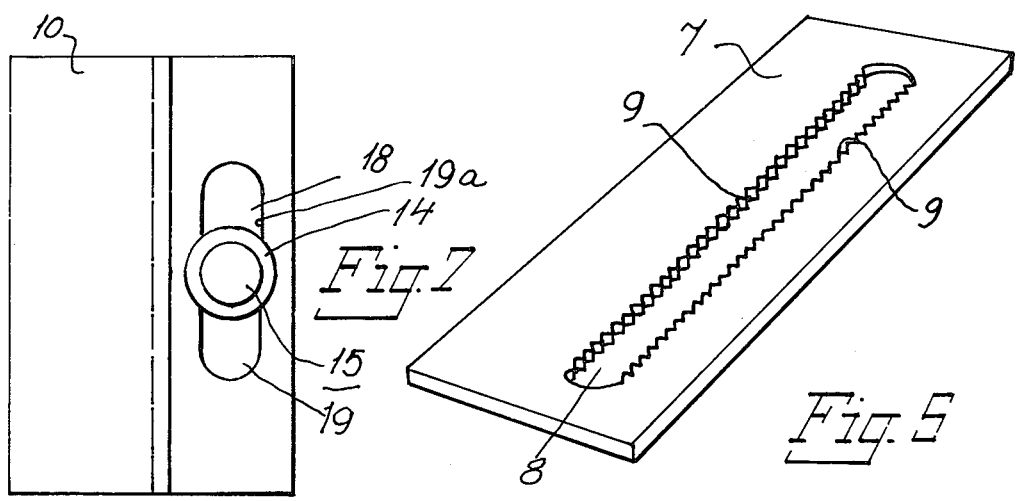

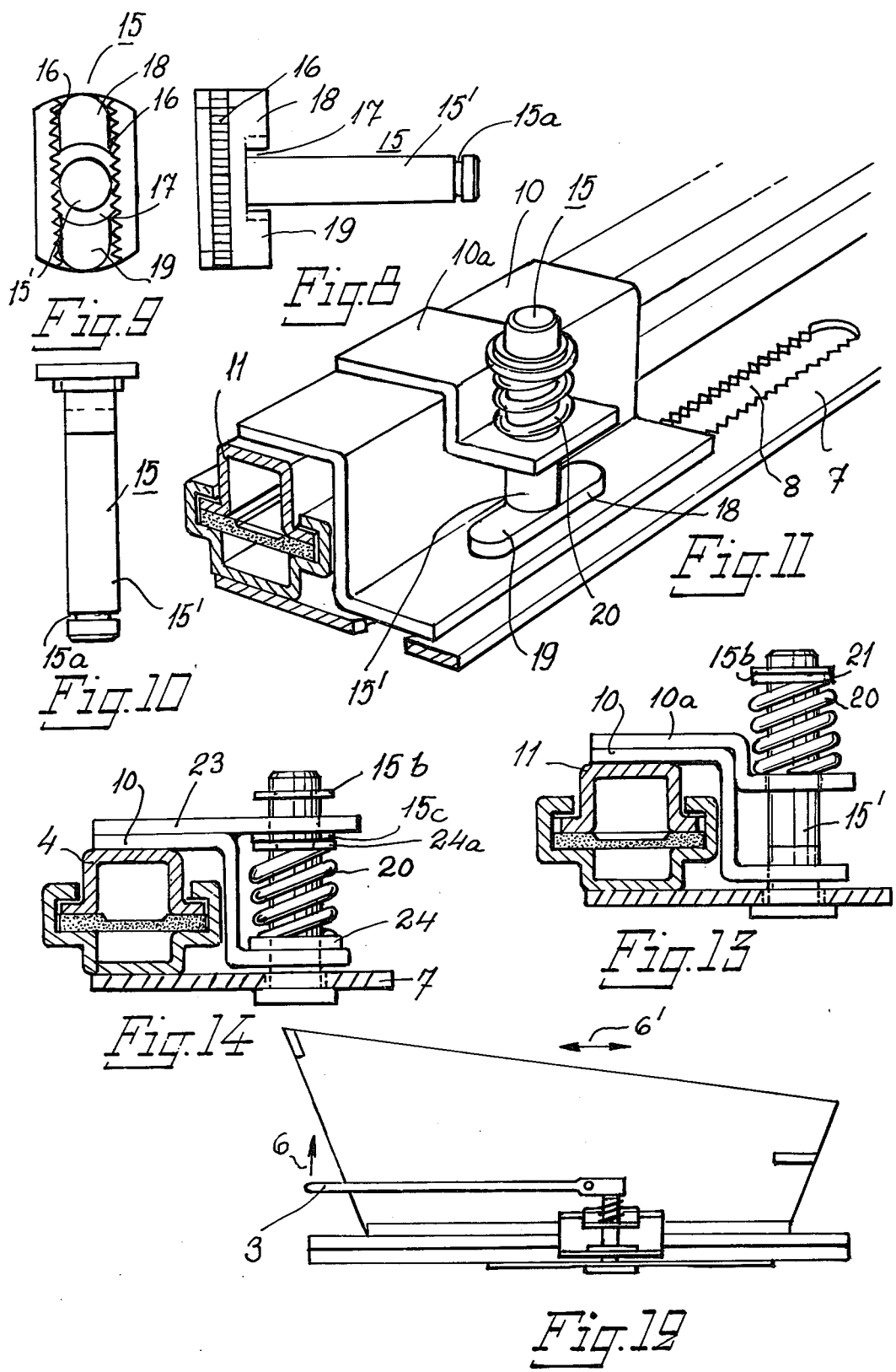

LOCKING DEVICE, PARTICULARLY FOR AUTOMOBILE SEATS

BACKGROUND OF THE INVENTION

1. Field of the Invention

This invention refers to a locking device which particularly may be utilized in connection with slide rails for automobile seats but which is not restricted to this field of use and to advantage may be utilized in other areas as well.

2. Description of the Prior Art

The increasingly stringent regulations that are being introduced in various countries requiring that automobile seats are to be retained in locked position in the event of a collision have resulted in that many of the presently existing locking devices for automobile seats do not fulfil the new requirements.

An automobile seat should be capable of being displaced in simple manner, i.e. the control means for adjustment are to be capable of being operated easily, but above all it is important that the seat must not be moved from its set position, even if it is subjected to exceptionally great forces, such as in a collision.

SUMMARY OF THE INVENTION

The present invention has the object of providing a locking device which fulfils these requirements. More specifically, the invention refers to a locking device for adjustably locking two mutually movable parts with respect to each other, particularly for blocking the longitudinal movement of an automobile seat with respect to the floor of an automobile, comprising (a) a stationary member secured to the floor of the automobile, (b) a movable member secured to the automobile seat, said stationary member being provided with an elongated aperture having teeth along its longitudinal sides, said movable member comprising a first bracket, (c) a locking pin, said locking pin having a shaft and an elongated head disposed at right angles to said shaft, said elongated head being provided with teeth on both of its longitudinal sides for engaging the teeth of the elongated aperture, (d) means for subjecting the shaft of the locking pin to a bias, said bias being such, that the teeth of the head of the pin and the teeth of the elongated aperture are held in secure engagement with each other in the locking position of the seat, and (e) a control member, said control member, being adapted, when actuated, to displace the head of the locking pin in the longitudinal direction of the shaft, with the teeth of the head of the locking pin being retained parallel to the teeth of the elongated aperture, said displacement being carried out to such extent that the teeth of the head of the locking pin disengage the teeth of the elongated aperture so that the stationary member and the movable member may be displaced longitudinally with respect to each other, whereas said teeth engage each other so as to ensure locking of the stationary member and the movable member with respect to each other when said control member is unactuated.

In addition to the locking device in accordance with the invention fulfilling the requirements that are being set up, the advantage is achieved that the automobile seat can be displaced in very small steps, namely approximately 3 millimeters, and that the forces that are generated will become distributed over comparatively large areas but do not load the locking mechanism per se to any substantial extent. The locking mechanism is retained locked even if the control device should happen to become inoperative for some reason or other. As the result of the locking mechanism being spring-biased no rattling sounds are generated. Finally, the end position stops of the mechanism are definite, i.e. no movement past the end positions is possible.

BRIEF DESCRIPTION OF THE DRAWINGS

The invention will be described more specifically below with reference to the accompanying drawings, in which

FIG. 3 shows a perspective view of the locking device on a larger scale;

FIG. 4 shows the locking device of FIG. 3 as viewed straight from the front;

FIG. 5 shows a perspective view of a bottom plate included in the locking device of the invention;

FIG. 6 shows a cross section through a bracket shaped in the form of an "S" as well as a bushing included in the locking device in accordance with the invention and also being visible in FIG. 4;

FIG. 7 shows the bracket of FIG. 6 and a locking pin introduced therein as viewed from above, FIG. 8 is a side view of said locking pin;

FIG. 9 is an end view of the locking pin of FIG. 8;

FIG. 10 is a side view of the locking pin of FIG. 8 but rotated 90° around its longitudinal axis as compared to FIG. 8;

FIG. 11 is a perspective view similar to FIG. 3 but showing another embodiment;

FIG. 12 is a view corresponding to FIG. 2 but associated with the embodiment of FIG. 11;

FIG. 13 is a view corresponding to FIG. 4 but referring to the embodiment of FIG. 11; and FIG. 14 is a sectional view corresponding to FIG. 13 but illustrating yet another embodiment.

The same component designations have been utilized in all the various figures to the extent that this has been possible.

DESCRIPTION OF THE PREFERRED EMBODIMENTS

Figure 1:
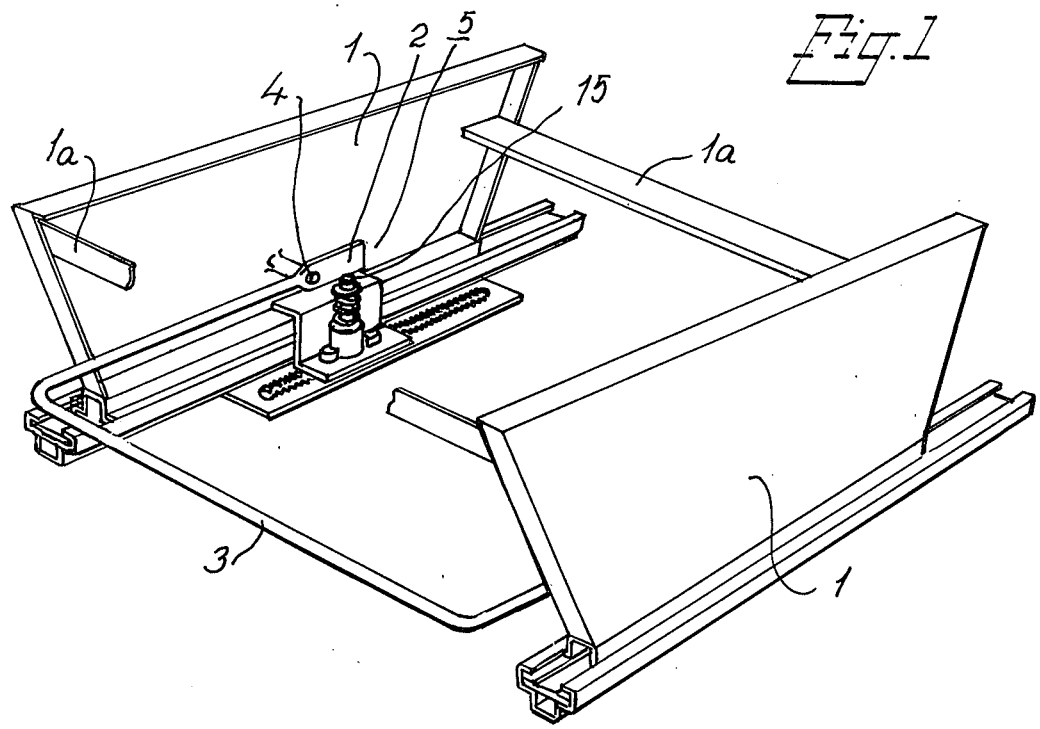
FIG. 1 shows a perspective view of the base of the bottom portion of an automobile seat with a locking device in accordance with the invention mounted thereon.

The perspective view of FIG. 1 shows the base associated with the bottom portion of an automobile seat and including side-pieces 1 braced by cross-braces 1a and comprising a locking device designed in accordance with the invention and having the general designation 5.

FIG. 1 also shows a U-shaped control rod 3 which is mounted at a point 4 (associated with a similar mounting point which is concealed behind the sidepiece of the base located nearest the viewer) and which has a free end 2 actuating a locking pin 15. A complete locking device of the same type as the one illustrated in FIG. 1 is concealed behind the nearest sidepiece 1, and thus complete symmetry exists.

Figure 2:
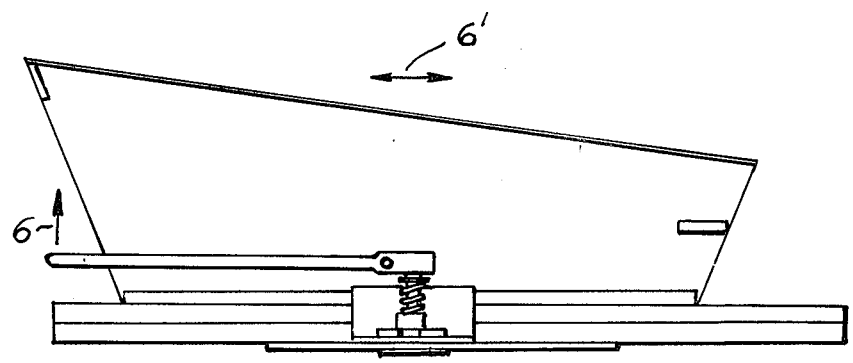
FIG. 2 shows a side view taken from the inside of the base of FIG. 1 and illustrating the locking device in accordance with the invention.

FIG. 2 shows a side view of the base in accordance with FIG. 1, with the arrow 6 indicating the direction in which the front end of the rod 3 is to be raised in order that the seat may be disengaged for displacement in the longitudinal direction of the car, i.e. in one of the directions of the double arrow 6'. However, the manner in which the locking device operates will be better seen in FIG. 3, which now is to be described, than in FIG. 2.

FIG. 3 shows the locking device 15 proper in a perspective view and in detail. A bottom plate 7, which is shown by itself in FIG. 5, consists of an elongated, preferably rectangular plate which is provided with an elongated aperture 8 along whose longitudinal edges teeth 9 are disposed. The intention is that plate 7 is to be carried by the lower slide rail of the base, said rail being disposed in such manner that there is a clearance between the automobile floor and the head of a locking pin to be described below. Plate 7 does not necessarily have to be entirely flat, and for example it may take the shape of a bracket formed into an "S" so that it becomes located a distance above the floor. If desired, the edges of the plate may be bent over for increasing the rigidity.

The rectangular plate 7 is stationarily affixed to a substantially U-shaped lower rail 13 which supports an elongated slide bar 13a. The rail 13 is immovable relative to the floor of the automobile. An elongated rail 11 can slide upon the bar 13a and is secured to the base 1 (compare FIG. 1) and thus to the automobile seat proper, i.e. the seat portion on which a person sitting in an automobile is to sit. A bracket 10 shaped to the form of an "S" is secured to rail 11, for example by means of welding. This bracket is shown in cross section in FIG. 6 together with a bushing 14 which is secured to the bracket and which is supported by the latter. The rail 11 can slide along the bar 13a, therein carrying the bracket 10 and the bushing 14 supported by the lower portion of the latter along in the movement. However, such movement is normally prevented in the following manner by means of a locking pin 15 illustrated in FIGS. 4 and 7.

The locking pin 15 is shown individually in different views in FIGS. 8, 9 and 10, respectively. The shaft 15' of the locking pin has circular cross section, and at one end it is provided with a peripheral groove 15a with the purpose of receiving a lock ring 15b. As may be seen in FIG. 9, the head of the locking pin is provided with two elongated rows of teeth 16 and it is also provided with a recess 17, thereby forming two raised heels 18 and 19. As may be seen in FIG. 9, the head of the locking pin is not circular, and it is miller or cut off in other manner on two sides so that it will have an elongated profile. FIG. 10 illustrates the pin 15 in accordance with FIG. 8 rotated 90° around its longitudinal axis.

As is illustrated by FIG. 4, an annular disc 21 is located below the locking disc 15b, and moreover a spring 20 is positioned between the upper portion of the bushing 14 and the lower side of the disc 21.

In FIGS. 3 and 4 the locking pin 15 is shown in its locking position, with the heels 18 and 19 protruding through the elongated slot 19a which is shown in the bracket 10 of FIG. 7. The teeth 16 on the head of locking pin 15, said teeth not being visible in FIG. 3, are urged into engagement with the teeth 9 in the elongated aperture in the plate 7 by the locking pin 15 being maintained secured in its locking position by means of the spring 20. The rows of teeth 16 are elongated in order to provide sufficient gripping strength between them and the rows of teeth 9 in the plate 7.

The locking device disclosed by the invention operates in such manner that when the automobile seat is to be displaced in its longitudinal direction the operator pulls the intermediate portion of rod 3 upwards in the direction indicated by the arrow 6 of FIG. 2, whereby the free rod ends 2 are urged against the upper ends of the locking pins 15 and said locking pins are urged downwardly against the action of the force of the spring 20 to such extent that the engagement between the teeth 16 of the locking pin and the teeth 9 of the rectangular plate 7 is relieved. However, the locking pin is still guided in the slot 19a by means of the heels 18 and 19 so that it remains in correct position for easily returning to locking position. The spring 20 is dimensioned such, that it comprises a stop for the downward movement of the locking pin so that the heels 18 and 19 cannot leave the slot 19a. The rail 11 and thereby also the bracket 10 can now be displaced in their longitudinal directions and will carry along the locking pin 15 in their movement. The position of the rail 11 can be adjusted in very small increments, namely approximatley 3 millimeters, because of the manner in which the cooperating teeth 16 and 9 are arranged. When a desired position of the seat has been found, the operator simply lets go of the rod 3, the fore-most portion of which then will be pivoted down towards the automobile floor by the action of the force of spring 20, simultaneously with the teeth 16 and 9 engaging each other.

FIG. 11 shows another embodiment of the locking device in accordance with the invention, wherein the original bracket 10 has been supplemented with a bracket 10a which in the illustrated example has the form of a faint "S", whereas the bushing 14 of FIG. 4 now has been removed. Thus, in the case of FIG. 11, the bracket 10a replaces said bushing. Apart from this, the function of the locking device is the same as in the first embodiment. FIG. 12 shows the embodiment of FIG. 11 from the side and mounted in the base of an automobile seat. In this case, too, the arrow 6 shows the direction in which the operator is to pull the rod 3. FIG. 13 shows a view from the front of the device of FIGS. 11 and 12 and illustrates the manner in which the spring 20 is clamped between a portion of a bracket 10a and disc 21.

FIG. 14 shows yet another embodiment in which the bracket 10 of S-shape has been supplemented with a straight bracket 23 which is stationarily secured to the original bracket 10. Not either in this case does any bushing exist, and the spring 20 is clamped between a lower disc 24 and an upper disc 24a which in turn engages a locking spring 15c. At its upper portion, the locking pin 15 is provided with the same locking disc 15b as previously, and this disc serves as a shoulder so as to define one end position of the locking pin 15, whereas the disc 15c defines the other end position.

The slot 19a is shown rounded at its ends for example in FIG. 7, and the same is the case of the corresponding portions of the heels 18 and 19, respectively, in FIG. 11, but it should be pointed out that the rounded portions naturally can be straight so that the slot will have the shape of a rectangle.

The invention is not limited to the embodiments described above and illustrated in the drawings, and these are solely examples of the invention and its utilization. Thus, for example the locking means formed by the disc 15b can be designed in other manner, and they may for instance consist of a pin. In another embodiment the locking pin 15 may alternatively be disposed horizontally or at a predetermined angle of inclination instead of vertically, and in such case of course the positions of the other components have to be adapted thereto. It is also possible to vary the appearance of the teeth.

I claim:

1. A locking device for adjustably locking two mutually movable parts with respect to each other, particularly for blocking the longitudinal movement of an automobile seat with respect to the floor of an automobile, comprising
    (a) a stationary member secured to the floor of the automobile,
    (b) a movable member secured to the automobile seat, said stationary member having an elongated aperture with teeth disposed along its opposed longitudinal sides, said movable member comprising a first bracket,
    (c) a locking pin, said locking pin having a shaft and an elongated head disposed at right angles to said shaft and aligned with the elongated aperture of said stationary member, said elongated head having a plurality of teeth on both of its opposing longitudinal sides for engaging selected teeth of the elongated aperture,
    (b) bias means for normally urging the teeth of the head of the pin and the teeth of the elongated aperture in secure engagement with each other in the locking position of the seat, and
    (e) a control member, said control member, being adapted, when actuated, to displace the head of the locking pin in the longitudinal direction of the shaft, with the teeth of the head of the locking pin being retained parallel to the teeth of the elongated aperture, said displacement being carried out to such extent that the teeth of the head of the locking pin disengage the teeth of the elongated aperture so that the stationary member and the movable member may be displaced longitudinally with respect to each other, whereas said teeth engage each other so as to ensure locking of the stationary member and the movable member with respect to each other when said control member is unactuated.

2. A locking device in accordance with claim 1, wherein said stationary member takes the form of an elongated plate.

3. A locking device in accordance with claim 1, wherein said stationary member takes the form of a second bracket shaped into an "S" with or without rigidity-promoting edges.

4. A locking device in accordance with claim 1, wherein said means for subjecting the locking pin to a bias for maintaining the engagement between the teeth of the stationary member and the teeth of the movable member when the locking device is in its locking position comprise spring means.

5. A locking device in accordance with claim 1, wherein said locking pin is guided in an elongated slot in said first bracket by means of a pair of protruding members extending through said slot and comprising portions of the head of said pin, said protruding members, when depressed to the disengaged position of the locking means, serving as guides against the crests of the teeth of the elongated aperture.

6. A locking device in accordance with claim 1, wherein said first bracket is secured to a third bracket comprising a guide for said pin shaft.

7. A locking device in accordance with claim 1, wherein said first bracket is secured to a bushing member which comprises a guide for said pin shaft.

8. a locking device in accordance with claim 5, wherein said spring means are disposed between a stop member of the locking pin and said third bracket.

9. A locking device in accordance with claim 7, wherein said spring means are disposed between a stop member of the locking pin and said bushing.

* * * * *